Sept. 11, 1962  H. W. PROCTOR  3,053,121
DRILL GUIDE

Filed Jan. 23, 1961  2 Sheets-Sheet 1

INVENTOR
Harold C. Proctor
BY Robert M. Dunning
ATTORNEY

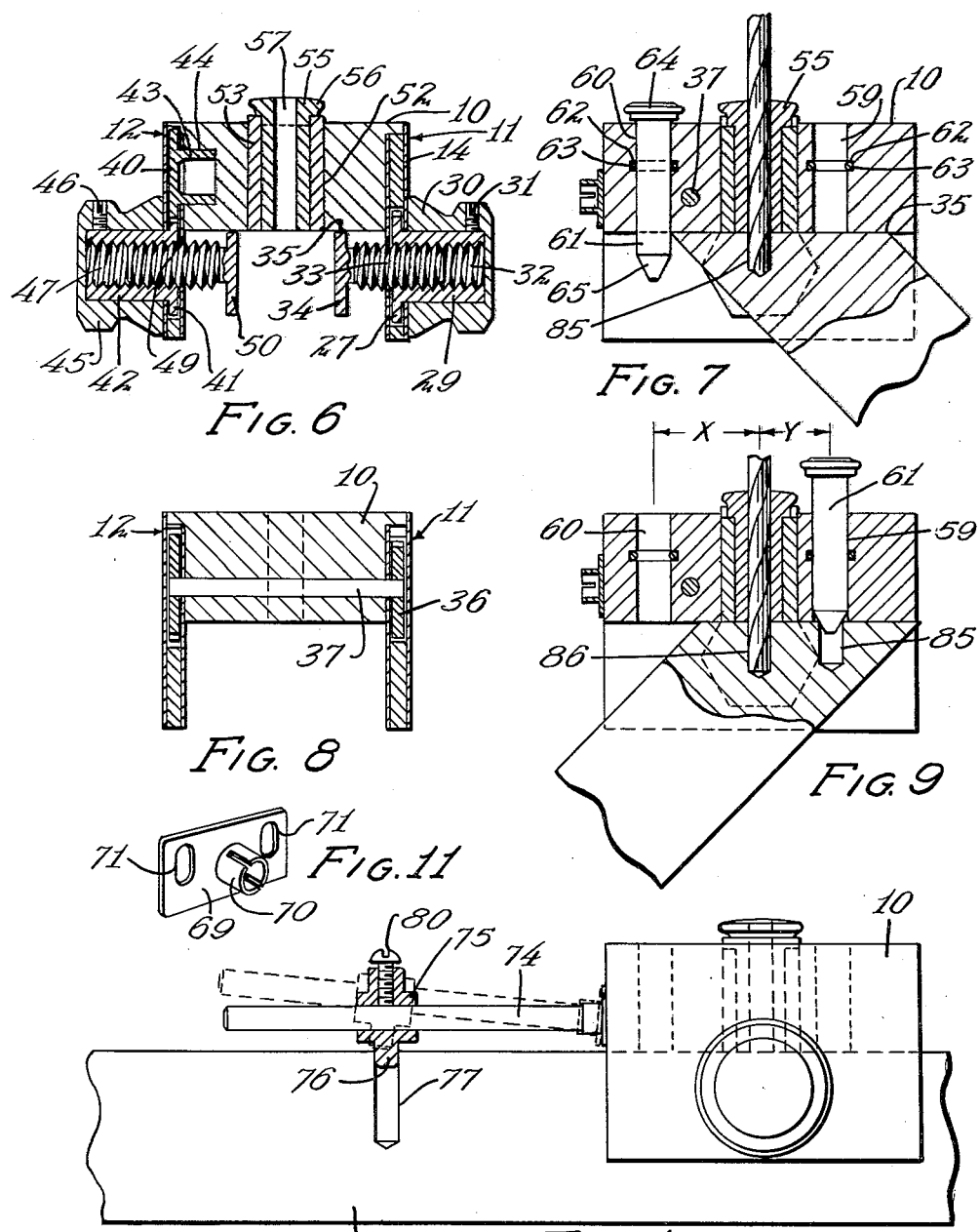

United States Patent Office 3,053,121
Patented Sept. 11, 1962

3,053,121
DRILL GUIDE
Harold W. Proctor, 818 S. Smith Ave., St. Paul, Minn.
Filed Jan. 23, 1961, Ser. No. 84,123
12 Claims. (Cl. 77—62)

This invention relates to an improvement in drill guide and deals particularly with an apparatus for use in accurately drilling holes in pieces of wood which are designed to be connected by dowel pins and the like.

Difficulty is often experienced in properly locating holes in the abutting edges of strips of wood or the like which are designed to be connected by dowel pins. Due to the fact that the dowels are usually completely enclosed in the wood when the parts are connected, it is essential that the holes be located with precision so that the parts will be accurately located when attached. Obviously, if the holes in one piece or another are not properly located, the abutting edges will not fit properly, or will not be in properly opposed relation when the two parts are put together. It is an object of the present invention to provide a drill guide which will locate the holes with extreme accuracy so that the connected parts will be properly located when the dowels are inserted.

A further feature of the present invention resides in the provision of an apparatus which will guide the drill so as to position the drill holes midway between the opposed surfaces of a strip of wood or the like. Thus, the proper centering of the dowels is insured.

A further feature of the present invention resides in the provision of a simple and effective apparatus for properly spacing the drilled holes so that they can be accurately matched with the holes in an abutting piece.

A further feature of the present invention resides in the provision of a device of the class described which can be produced at relatively low cost for a device having exceptional accuracy.

A further feature of the present invention resides in the provision of a device of the type described which may be accurately secured to a board in such a manner as to locate drill holes which are centrally located between two opposed surfaces of the board, and which may be easily operated from either side of the apparatus. In preferred form, the apparatus is provided with opposed knobs which may be rotated to position the guide upon the board, and which are operable in unison from opposite sides of the apparatus. As a result, the device may be attached in place from either side of the apparatus with equal ease.

A further feature of the present invention resides in the provision of a drill guide which may be attached to extend longitudinally of a board to be drilled, and which is provided intermediate its ends with a guide opening through which the drill is designed to extend. This drill opening is designed to accommodate hardened bushings of various sizes designed to accommodate drills of varying diameters. Gauge openings are also provided in longitudinal alignment and parallel relation to the drill opening and on opposite sides thereof. The gauge opening on one side of the drill opening is spaced from the drill opening a predetermined fixed distance, and the gauge opening on the opposite side of the drill opening is longitudinally spaced from the drill opening a distance equal to one and one-half times the distance between the axes of the first named openings. As a result, a series of parallel apertures may be drilled in a wooden strip or the like with a maximum of accuracy and a minimum of difficulty.

A further feature of the present invention resides in the provision of an apparatus of the type described which may, if desired include an extension which may be employed for accurately drilling holes at a distance apart greater than the length of the body of the drill guide.

These and other objects and novel features of the present invention will be more clearly and fully set forth in the following specification and claims.

In the drawings forming a part of the specification.

FIGURE 6 is a transverse sectional view through the apparatus, the position of the section being indicated by the line 6—6 of FIGURE 3.

FIGURE 7 is a vertical section through the apparatus, the position of the section being indicated by the line 7—7 of FIGURE 3.

FIGURE 8 is a vertical sectional view through the apparatus, the position of the section being indicated by the line 8—8 of FIGURE 3.

FIGURE 9 is a view similar to FIGURE 7, and showing the manner in which a plurality of openings can be properly spaced in a work piece.

FIGURE 10 is a side elevational view of the apparatus when used in conjunction with a spacing extension.

FIGURE 11 is a perspective view of a portion of the extension shown in FIGURES 1 and 10.

FIGURE 12 is a plan view of one type of joint which may be formed by the apparatus illustrated.

Figure 5:
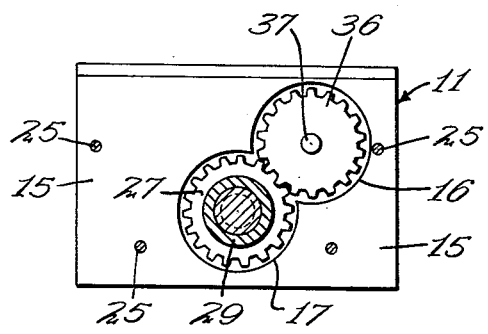
FIGURE 5 is a vertical sectional view through the apparatus, the position of the section being indicated by the line 5—5 of FIGURE 3.

The drill guide is indicated in general by the letter A. In the particular arrangement illustrated, the guide includes a generally rectangular block-like body 10 which is designed to overlie the work piece B and which supports a pair of generally rectangular hollow housings 11 and 12 along opposite longitudinal edges thereof. As indicated, the housing 11 includes an inner plate 13, and an outer plate 14, and an intermediate filler plate 15. FIGURE 5 of the drawings illustrates the housing 11 with the outer plate 14 removed, and shows the filler plate 15 as including a pair of intersecting circular chambers 16 and 17 for a purpose which will be later described.

Figure 4:
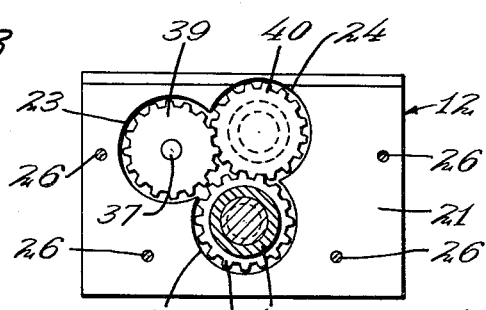
FIGURE 4 is a vertical sectional view through the drill guide, the position of the section being indicated by the line 4—4 of FIGURE 3.

The compartment 12 is shown as including an inner plate 19, a parallel outer plate 20, and an intermediate spacer plate 21. As indicated in FIGURE 4 of the drawings, the spacer plate 21 is provided with three intersecting circular chamber 22, 23 and 24 therein for a purpose which will be later described. Bolts or other suitable fastening means 25 hold the chamber 11 assembled, while similar bolts 26 hold the chamber 12 assembled.

A gear 27 having an axially extending hub 29 is mounted in the circular aperture 17 in the spacing plate 15 with the hub 29 extending through the outer covering plate 14 and held in proper axial relation thereby.

A knob 30 is secured upon the hub 29 by a set screw 31 or other suitable fastening means. The hub 29 is provided with an internally threaded axial socket 32. A threaded shank 33 is engaged in the socket 32 and is provided at its inner end with a generally rectangular clamping plate 34, the upper edge 35 of which rides along the under surface of the block-shaped body 10. As is indicated in FIGURE 5 of the drawings, the gear 27 is in mesh with a cooperable gear 36 mounted upon a counter shaft 37 extending transversely through the body 10. The gear 36 is rotatable in the arcuate chamber 16. A gear 39, illustrated in FIGURE 4 of the drawings, is also mounted upon the shaft 37 and is rotatable in the chamber 23 in the spacer plate 21. The gear 39 is in engagement with an idle gear 40 which in turn is in engagement with a gear 41 in the chamber 22 in the spacer plate 21. The gear 22 is provided with an outwardly extending hub 42. As is indicated in FIGURE 6 of the drawings, the gear 40 is provided with a hollow hub 43 which is seated in a suitable bearing recess 44 in the block-like body 10.

A knob 45 is mounted upon the hub 42 and is held from rotation with respect thereto by a set screw 46. The hub 42 is provided with an internally threaded socket 47 designed to accommodate a threaded shank 49. The shank 49 is provided with a generally rectangular clamping plate 50 on its inner extremity, the clamping plate 50 being slidable along the under surface of the block 10.

From the foregoing description, it will be evident that the knobs 30 and 45 are rotatable in unison, and rotation of the knobs in one direction will act to move the clamping plates 34 and 50 inwardly toward the center of the body 10, and operation of the knobs in the opposite direction will move these clamping plates 50 outwardly. The clamping plates 34 and 50 are at all times equally spaced on opposite sides of the center of the body 10.

Figure 1:
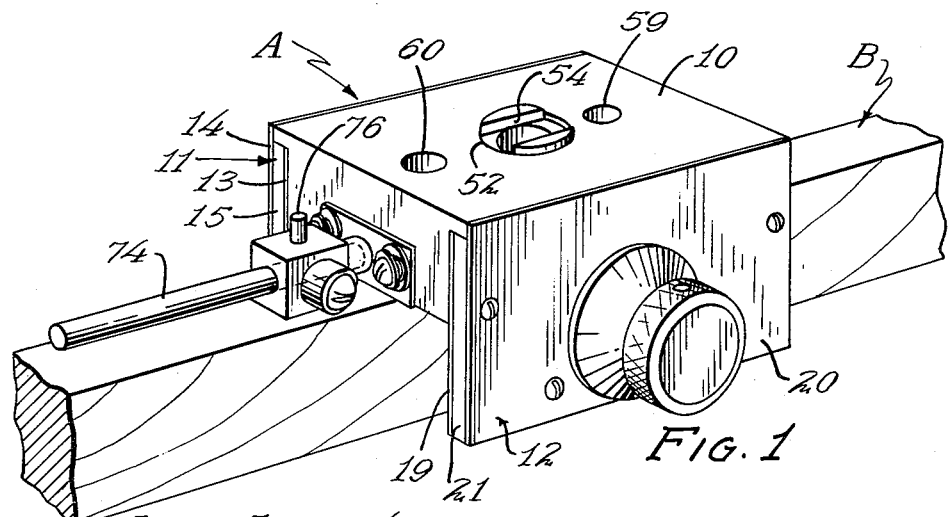
FIGURE 1 is a perspective view of the drill guide in position on a strip of wood, showing the general arrangement of parts therein.
Figure 2:
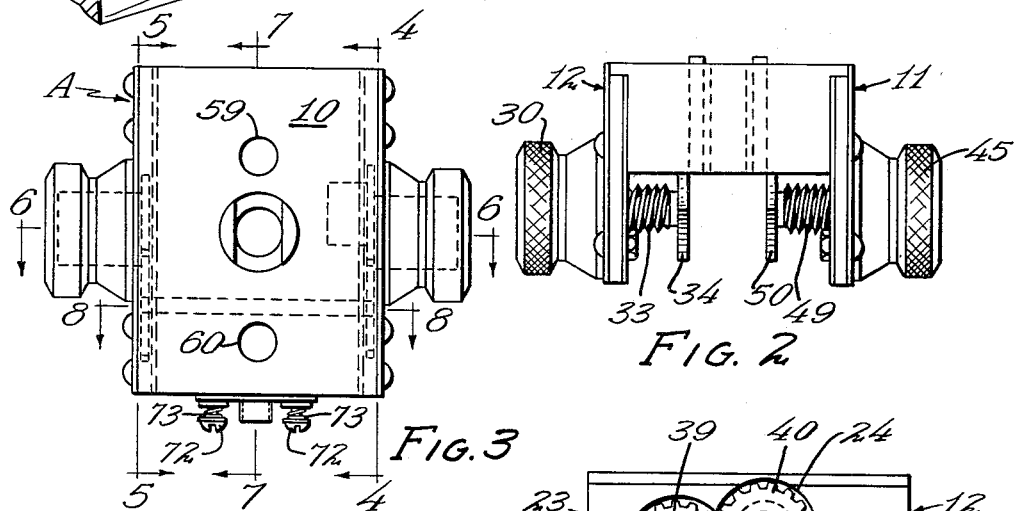
FIGURE 2 is an end elevational view of the guide illustrated in FIGURE 1.

A central vertical aperture 52 extends vertically through the body 10 along the longitudinal center line of the body between the clamping plates 34 and 50. A bushing 53 is engaged in the aperture 52, preferably with a press fit to remain in fixed relation thereto. The upper end of the bushing 53 extends slightly above the upper surface of the body 10 in preferred form, and is longitudinally grooved as indicated in FIGURE 1 at 54. A sleeve or bushing 55 is provided with an enlarged head 56 which is notched to fit within the groove 54 so as to hold the bushing 55 from rotation within the outer bushing 53. The inner bushing 56 is provided with an aperture 57 which is of proper diameter to accommodate a drill of a predetermined size. In actual practice, several bushings 55 are provided having different sized apertures 57 so as to accommodate drills of various diameter. The bushing 55 is preferably hardened to provide a drill guide, and the axis of the aperture 57 is on a plane intermediate the inner surfaces of the clamping plates 34 and 50.

Figure 3:
FIGURE 3 is a top plan view of the guide shown in FIGURES 1 and 2.

As indicated in FIGURES 1, 3 and 7 of the drawings, the body 10 is provided with vertical apertures 59 and 60, the axes of which are on a vertical plane through the axis of the aperture 52 and extending longitudinally of the body 10.

The apertures 59 and 60 are preferably of the same diameter and are designed to accommodate a guide pin 61 which fits in the apertures with a snug sliding fit. The interior surfaces of the apertures 59 and 60 are provided with peripheral grooves 62 designed to accommodate resilient rings 63. The rings 63 are designed to frictionally engage the cylindrical outer surface of the pin 61 to hold the pin in an adjusted position by friction.

The pin 61 is provided with an enlarged head 64 designed to limit the insertion of the pin into the apertures. The pin is also provided with a frusto conical lower end 65 which is designed to center the pin within previously formed apertures in the surface of the work piece to be drilled if the apertures are of smaller diameter than the pin. In usual practice, the bushings 55 are designed to accommodate standard sizes of drills which may be, for example, in a range of from 3/16 of an inch to 3/8 of an inch and the positioning pin 61 may also be 3/8 of an inch in outer diameter to fit into the largest of these apertures. Obviously, these sizes are merely for the purpose of illustration. It will be noted that the cylindrical portion of the pin 61 extends below the under surface 35 of the body 10 when in fully projected position.

In the preferred form of construction, the aperture 60 is located with its axis spaced from the axis of the bushing 55 a distance which is one and one-half times the distance between the axis of the bushing 55 and the axis of the other aperture 59. With reference to FIGURE 9 of the drawings, the distance X is one and one-half times the distance Y. The purpose of this arrangement is to permit dowel holes to be drilled in the work piece in more closely spaced relation than would otherwise be practical, as will be later described in detail.

A bracket plate 69 is mounted on one end of the body 10 and supports an expandable and contractable sleeve 70 on an axis which intersects the axis of the bushing 55 at right angles. The bracket plate 69 is provided with spaced vertically elongated slots 71 designed to accommodate fastening screws 72 best illustrated in FIGURE 3 of the drawings. Springs 73 are interposed between the heads of the fastening screws 72 and the bracket plate 69 to normally hold the bracket plate flush against the end surface of the body 10. A spacing arm 74 is illustrated in FIGURES 1 and 10 of the drawings resiliently supported in the resilient sleeve 70 to extend at right angles to the end surface of the body 10. A cross head 75 is slidable longitudinally of the rod 74 and includes a downwardly extending projection 76 designed to extend into a previously drilled aperture 77 in a work piece 79. The cross head 75 is held in adjusted position by a set screw 80. The cross head 75 is preferably rectangular in cross section and includes projections 76 on each surface thereof, the projections being of different diameter so as to fit in apertures of different sizes.

In operation, the drill guide is designed to form recesses or sockets designed for use in accommodating dowel pins to hold the abutting edges of two pieces in their proper relationship. The device may be used to center the holes or sockets between the opposed side edges of the strips to be attached, and to drill the sockets or holes at equal intervals. In actual practice, the device is so accurate that the surfaces of the strips attached are almost completely flush and the distance between the holes or sockets is so accurate that the dowels will fit properly even if the position of one piece is reversed relative to the other.

In drilling a series of dowel sockets, the first socket is drilled at a desired distance from the end of the surface being drilled, and this may be gauged if desired in the manner illustrated in FIGURE 7 of the drawing by inserting the pin 61 through the surface 35, and engaging the guide in place with the surface of this pin against the end edge. In the particular arrangement illustrated, two members are being pinned together at right angles although this is obviously a matter of choice. If the surface of the pin 60 engages the end of both pieces, the position of the first dowel socket will be definitely located at a predetermined distance from the end edge of the surface being drilled.

After the first aperture has been drilled, as indicated in FIGURE 7 of the drawings, the guide may be detached and reversed in position. The tapered end 65 of the pin 61 may be engaged in the first formed drill hole 85. The guide may be again clamped in place in reversed form as indicated in FIGURE 9, and a second hole may be drilled as indicated at 86. The hole 86 is at a fixed distance from the hole 85. It is is desired to drill a third dowel socket to the left of the hole or socket 86 in FIGURE 9, the guide A may again be reversed, and the pin 61 inserted in the guide aperture 60 in place of the aperture 69 as during the previous drilling operation. If the device is reversed and the pin in the aperture 60 engaged in the hole 85, a third hole or socket will be formed which is spaced from the socket 86 a distance equal to one-half the distance between the sockets 85 and 86. By returning the pin 61 to the aperture 59, and reversing the apparatus, the end of the pin 61 may then be inserted into the last drilled opening, and an additional hole or socket may be formed midway between the apertures 85 and 86.

In other words, the guide as illustrated is capable of drilling spaced dowel sockets in the surface to be drilled which are spaced apart a distance equal to the distance Y; a distance equal to the distance X, or a distance equal to one-half the distance Y if closely adjoining dowels are desired. Due to the fact that the tapered end 65 of the pin 61 centers the guide relative to any socket drilled, the spacing between the dowel openings is extremely accurate. If the dowel holes are to be spaced a greater distance apart, this can be accomplished by the extension 74 and the cross head 75 which is adjustably supported at any desired distance from the body of the drill guide.

It should further be noted that the bearing plates 34 and 50 may be centered on opposite sides of the center of the body 10 with extreme accuracy. This is possible because of the fact that the gears on one side of the body are provided with a different number of gear teeth than the gears on opposite sides thereof. For example, the smaller gears 39, 40 and 41 on one side of the body may be each provided with sixteen teeth while the gears on the opposite sides thereof indicated at 27 and 36 may be of slightly larger diameter and may contain, for example, nineteen teeth. When the gears are all in mesh, the number of teeth in the gears is unimportant as both of the clamping plates 34 and 50 will advance at the same rate of speed. However, if one of the clamping plates 34 or 50 should be found to be slightly farther from the center of the body 10 than the other, an adjustment may be made by removing one of the covering plates, and changing the relationship of one gear relative to the other.

Due to the difference in the number of teeth on opposite sides of the device, an extremely accurate setting may be accomplished.

In accordance with the patent statutes, I have described the principles of construction and operation of my improvement in drill guide, and while I have endeavored to set forth the best embodiment thereof, I desire to have it understood that changes may be made within the scope of the following claims without departing from the spirit of my invention.

I claim:

1. A drill guide including an inverted generally channel-shaped body having a base portion and opposed parallel sides depending therefrom, a pair of axially aligned sockets rotatably supported by said parallel sides and held from axial movement relative thereto, said sockets having inwardly opening internally threaded socket openings therein, threaded shanks supported in said sockets, bearing plates having parallel inner surfaces on the inner ends of said shanks engageable with said channel base for holding said shanks from rotation, means connecting said sockets for rotating said sockets in unison, rotaton of said sockets moving said bearing plates toward or away from each other, said base having a drill guide aperture therethrough, the axis of the aperture being on a plane substantially parallel to, and intermediate the planes of the inner surfaces of said bearing plates.

2. The structure of claim 1 and in which said base includes a second aperture parallel to the first aperture and on said plane substantially parallel to, and intermediate, the planes of the inner surfaces of said bearing plates.

3. The structure of claim 1 and including a knob on one of said sockets and extending outwardly of one of said sides of said body by means of which said sockets may be rotated.

4. The structure of claim 1 and including knobs connected to both said sockets and extending outwardly from said body sides by means of either of which said sockets may be rotated.

5. A drill guide including an inverted generally channel-shaped body having a base portion and opposed parallel sides depending therefrom, a pair of axially aligned sockets rotatably supported by said parallel sides and held from axial movement relative thereto, said sockets having inwardly opening internally threaded socket openings therein, threaded shanks suported in said sockets, bearing plates having parallel inner surfaces on the inner ends of said shanks engageable with said channel base for holding said shanks from rotation, means connecting said sockets for rotating said sockets in unison, rotation of said sockets moving said bearing plates toward or away from each other, said base having a drill guide aperture therethrough, said base also having a pair of guide pin apertures longitudinally spaced on opposite sides of said drill guide aperture, the axes of said apertures lying on a common longitudinal plane parallel to the planes of the parallel inner surfaces of said bearing plate, and a guide pin slidably supported in either of said apertures.

6. The structure of claim 1 and in which the axis of one of said guide pin apertures is spaced from the axis of said drill guide aperture one and one-half times the distance between the axes of the other guide pin aperture and the drill guide aperture.

7. The structure of claim 6 and in which the guide pin includes a frusto-conical end.

8. The structure of claim 6 and in which the guide pin includes a frusto-conical end, and is of sufficient length to permit said frusto-conical end to extend entirely below the under surface of said base while the other end projects above said base.

9. The structure of claim 5 and including friction means in said guide pin apertures engageable with said guide pin to hold the same in an adjusted relation in said guide pin aperture.

10. The structure of claim 5 and including a drill guide bushing in said drill guide aperture and including cooperable means between said bushing and said base for holding said bushing from rotation.

11. A drill guide including a body, opposed clamping means at right angles to a surface of said body for holding said body in an adjusted position on a work piece with the surface of the work piece to be drilled in face contact with said surface of said body, said body having a drill guide aperture therethrough, said body having a pair of guide pin apertures spaced on opposite sides of said drill guide aperture, said apertures all having their axes on a plane parallel to, and between said clamping means and perpendicular to said surface of said body, the distance between the axis of one guide pin aperture and said drill guide aperture being one and one-half times the distance between the axes of the drill guide aperture and of the other guide pin aperture, and a guide pin slidably supported selectively in either of said guide pin apertures.

12. A drill guide comprising an inverted generally channel-shaped body including a base and parallel sides depending from said base, a pair of hubs rotatably supported in axial alignment in said sides and held from axial movement with respect thereto, said hubs being internally threaded, threaded shanks engaged in said hubs and extending inwardly therefrom, clamping plates having parallel inner surfaces on the inner ends of said shanks and slidable along a surface of said base to restrain said shanks from rotation, a gear on each said hub, a shaft extending through said base on an axis perpendicular to the planes of the inner surfaces of said clamping plate, gears on opposite ends of said shaft, one of said gears being in mesh with one of said gears on one said hub, an idle gear pivotally supported by said body on an axis parallel to the axis of said shaft and in mesh with the other of said gears on said shaft and with the other gear on the other of said hubs, and means for rotating one of said hubs, rotation of said one hub acting through said gears and shaft to rotate the other hub in the opposite direction, rotation of said hubs in opposite directions acting to move said clamping plates together or apart, said base having a drill guide aperture extending therethrough on an axis perpendicular to said surface of said base and parallel to said clamping plate surfaces.

References Cited in the file of this patent

UNITED STATES PATENTS 2,783,665     Saunders  ---------------- Mar. 5, 1957